May 28, 1963 E. B. DICKISON 3,091,156
MECHANISM FOR MOVING AN ELEMENT ALONG AN IRREGULAR PATH
Filed Sept. 26, 1960 3 Sheets-Sheet 1

INVENTOR
E. B. DICKISON
BY A. C. Schwarz, Jr.
ATTORNEY

May 28, 1963 E. B. DICKISON 3,091,156
MECHANISM FOR MOVING AN ELEMENT ALONG AN IRREGULAR PATH
Filed Sept. 26, 1960 3 Sheets-Sheet 2

INVENTOR
E.B. DICKISON
BY
a.c. Schwarz Jr.
ATTORNEY

May 28, 1963 E. B. DICKISON 3,091,156
MECHANISM FOR MOVING AN ELEMENT ALONG AN IRREGULAR PATH
Filed Sept. 26, 1960 3 Sheets-Sheet 3
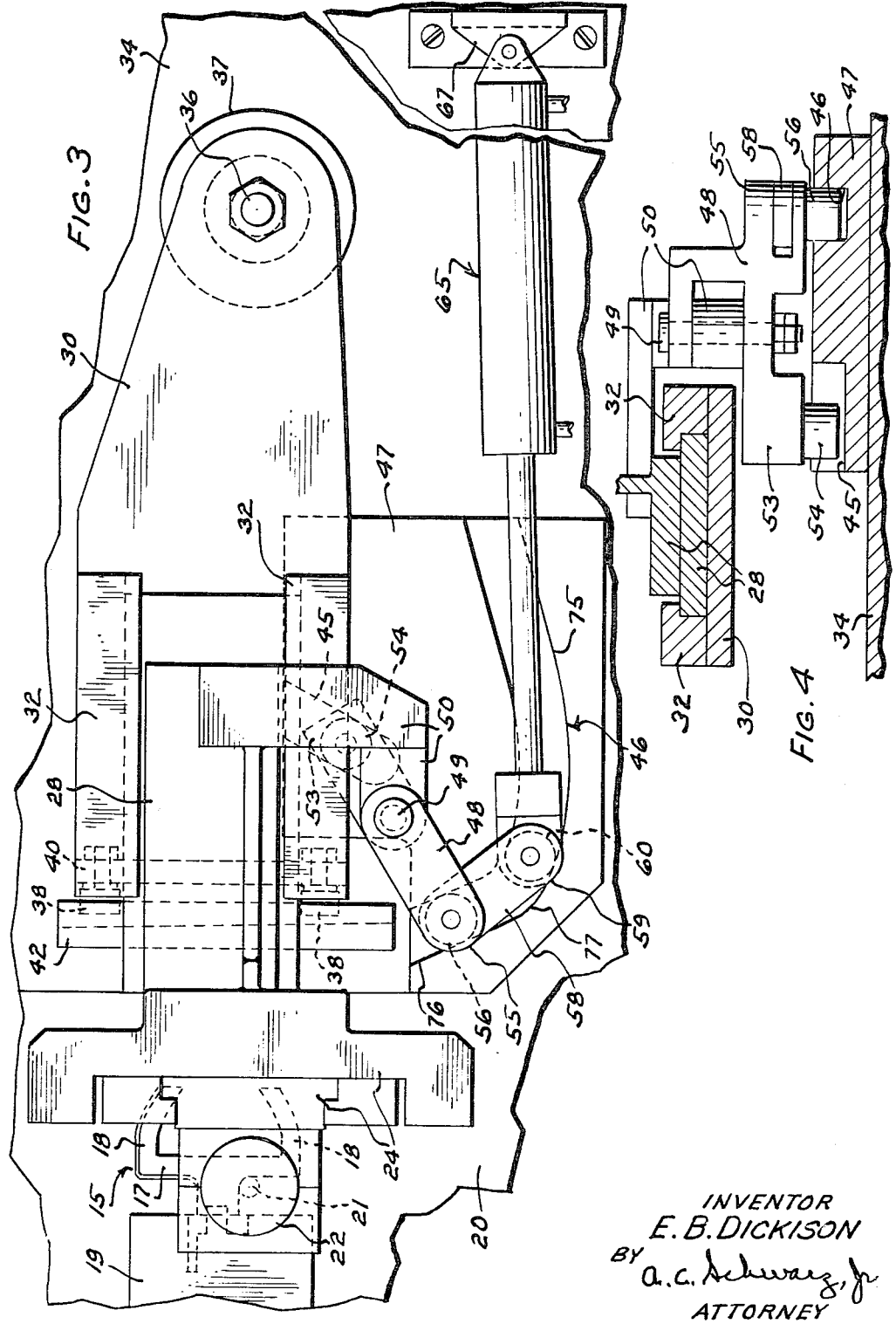
INVENTOR
E. B. DICKISON
BY a.c. Schwarz, Jr.
ATTORNEY

United States Patent Office 3,091,156
Patented May 28, 1963

3,091,156
MECHANISM FOR MOVING AN ELEMENT
ALONG AN IRREGULAR PATH
Earl B. Dickison, Indianapolis, Ind., assignor to Western
Electric Company, Incorporated, New York, N.Y., a
corporation of New York
Filed Sept. 26, 1960, Ser. No. 58,385
9 Claims. (Cl. 90—13)

This invention relates to contour milling machines, and more particularly to a mechanism for moving an element along an irregular path.

In the fashioning of certain articles, such as cast metal telephone switch hooks for supporting the receiver of a telephone, an objectionable molded flash is formed on the hook. This flash is generally removed in a milling operation to enhance the appearance of the hook. However, the irregular contour of the switch hook presents a problem in effecting the removal of the flash.

An object of the present invention is to provide an improved mechanism for moving an element along an irregular path.

Another object of the invention is to provide a milling apparatus having mechanism for guiding a milling cutter through an irregular path conforming to the contour of the work being acted on.

With these and other objects in view, the invention contemplates the provision of a work holder for fixedly supporting the work, and a carrier mounted on a frame for lateral movement about a fixed pivot. A tool holder for supporting a rotary milling cutter is slidably mounted on the carrier for lateral movement therewith and for longitudinal movement relative thereto toward and from the work holder substantially radially of the pivot. A lever pivotally connected intermediate its ends to the tool holder has cam followers at the ends thereof, which followers ride in a pair of fixed cam tracks. An actuator mounted on the frame advances the followers in the cam tracks which are shaped to effect selective movement of the tool holder longitudinally and laterally to guide the milling cutter through a predetermined path conforming to the contour of the work.

Other objects, advantages and novel aspects of the invention will become apparent upon consideration of the following detailed description, in conjunction with the accompanying drawings wherein:

FIG. 3 is a fragmentary plan view of the apparatus showing the milling cutter and portions of the mechanism in the advanced position; and FIG. 4 is a vertical transverse sectional view of the apparatus taken on the line 4—4 of FIG. 1.

Figure 1:
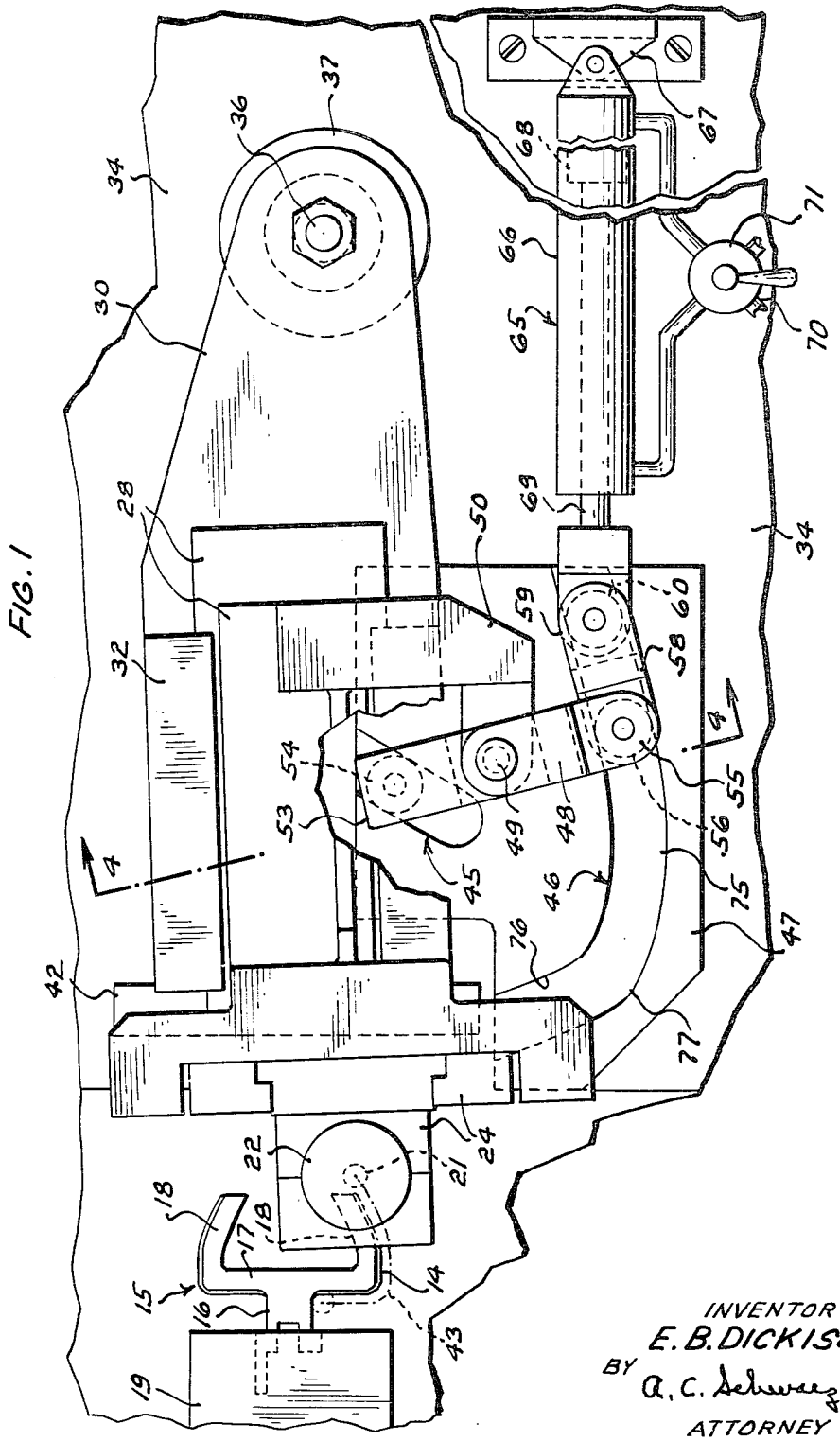
FIG. 1 is a fragmentary plan view of a milling apparatus embodying the present invention and showing the milling cutter and a portion of the mechanism in normal retracted position.
Figure 2:
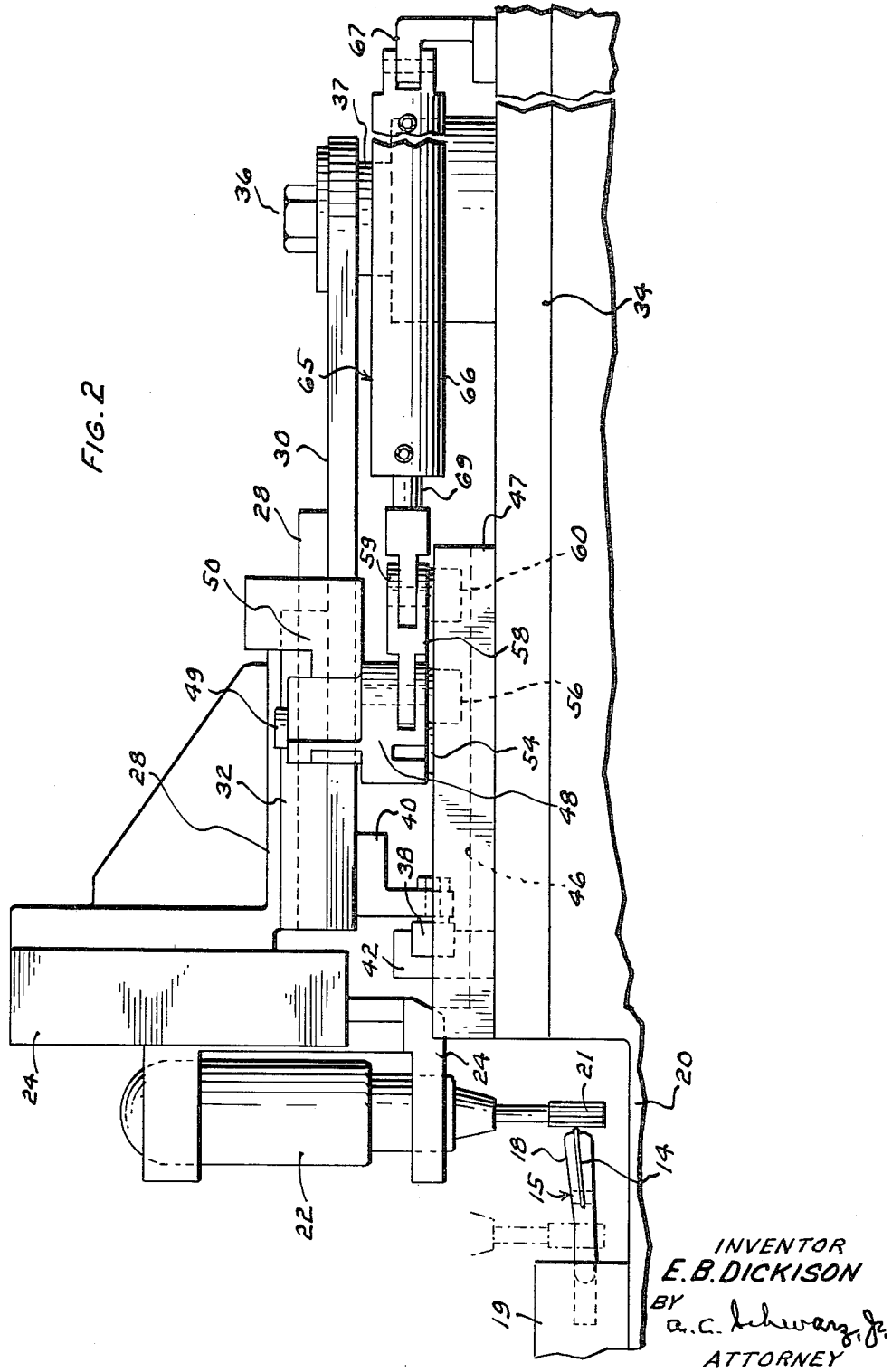
FIG. 2 is a fragmentary side elevational view of the apparatus.

The present apparatus is designed to remove the parting line flash 14 from a portion of the outer surface of a cast metal switch hook 15 of a telephone set (FIGS. 1 and 3). The hook has a body portion 16 provided with a cross arm 17 from the ends of which a pair of curved fingers 18 extend laterally and cooperate with the cross arm 17 to form a nest for supporting one end of the telephone receiver. The flash 14 to be removed with the present apparatus extends from the end of one of the curved fingers 18 along the outer contour thereof and along the outer face of the laterally extending portion of the cross arm 17 to the body portion 16 of the hook.

The apparatus has a work holder 19 for supporting the hook 15 in fixed position during the removal of the flash 14 from the hook. The work holder 19, shown somewhat diagrammatically, is secured to a fixed frame or other support 20. If desired, the work holder may be mounted on a turret capable of being indexed to advance the hook to successive stations for successive operations thereon.

The apparatus also includes a flash removing tool in the form of a milling cutter 21 which is rotated by a motor 22 that operates with any suitable motive power. The motor 22 is supported in a holder 24 which is attached to a slide 28 for horizontal movement therewith. The slide 28 is mounted on a carrier 30 and is guided by a pair of gibs 32 for longitudinal reciprocable movement thereon toward and away from the work holder 19 and the switch hook 15. The carrier 30 is in the form of a plate that is supported on a horizontal member 34 of the frame 20 for pivotal movement about a fixed pivot 36 at one end of the carrier. The pivot 36 is mounted on an upwardly directed boss 37 on the frame member 34, the boss 37 serving to support one end of the carrier above and in spaced relation to the frame member 34. The other end of the carrier 30 is supported for lateral movement by rollers 38 which are connected to the carrier 30 by brackets 40 and ride in a guideway 42 fixed to the horizontal frame member 34. The longitudinal movement of the slide 28 and the milling cutter 21 is substantially radial to the pivot 36 (FIG. 1).

Mechanism is provided for moving the slide 28 longitudinally and for moving the slide 28 and the carrier 30 laterally about the pivot 36 to effect the movement of the milling cutter 21 through an irregular path indicated by dotted line 43 (FIG. 1) and conforming to the outer contour of the portion of the hook 15 from which the flash 14 is to be removed. This mechanism includes a pair of cam tracks 45 and 46 formed as grooves in a cam plate 47 secured to the horizontal frame member 34. A lever 48 is pivotally connected intermediate its ends as at 49 to the slide 28 by means of an arm 50 extending laterally from the slide.

Secured to one end 53 of the lever 48 is a follower 54 that rides in the cam track 45, and secured to the other end 55 of the link 48 is a follower 56 which is movable along the cam track 46. Also connected to the end 55 of the lever 48 is one end of a link 58, the other end 59 of which has connected thereto a follower 60 that is movable along the cam track 46.

Movement is imparted to the tool holder 24 and the milling cutter 21 through the lever 48 and the link 58 by a fluid operated actuator 65. This actuator comprises a cylinder 66 which is pivotally supported on a bracket 67 fixed to the horizontal frame member 34. A piston 68 reciprocable within the cylinder 66 has a piston rod 69 which is pivotally connected to the end 59 of the link 58. Reciprocation is imparted to the piston by compressed air from a suitable supply line 70 under control of a valve 71.

As shown particularly in FIG. 1, the track 45 is relatively short and is disposed obliquely in one direction. The cam track 46 has a relatively long curved first end portion 75, a second relatively short obliquely disposed end portion 76 and a sharply curved intermediate portion or knee 77 at the juncture of the portions 75 and 76. The curved first portion 75 of the cam track 46 corresponds generally to the outer contour of the finger 18 from which the flash 14 is to be removed and is disposed in fixed and substantially parallel relation thereto.

The arrangement of the cam tracks 45 and 46, the linkage 48 and 58, and the followers 54, 56 and 60 associated therewith is such that in response to operation of the actuator 65, the milling cutter 21 is moved along the curved path 43 conforming to the contour of a portion of the switch hook 15 to remove the flash therefrom.

In response to actuation of the valve 71 and movement of the piston 68, the end 55 of the lever 54 is advanced along the cam track 46 while the end 53 of the lever and the follower 54 thereon serves as a fulcrum, the follower 54 being restricted for limited movement in the obliquely disposed cam track 45. The forward advancing movement of the follower 56 in the portion 75 of the cam track 46 causes the lever 48 to swing about the follower 54 and through its connection with the slide 28 and the tool holder 24 it effects longitudinal and lateral movement of the milling cutter 21 through a curved path conforming to the outer contour of the finger 18. During this movement the milling cutter removes the flash 14 from the finger 18 of the hook.

As the follower 56 traverses the curved knee portion 77 of the track 46, the milling cutter 21 is moved around the corner portion of the hook at the juncture of the finger 18 and the cross arm 17 to remove the flash therefrom. As the piston 69 advances the follower 60 in the track 46 to the knee portion 77 as shown in FIG. 3, the link 58 pushes the follower 56 along the obliquely disposed portion 76 of the cam track. This movement causes the lever 48 to impart a lateral movement to the slide 28 and the carrier 30 about the pivot 36 to effect the movement of the milling cutter 21 along the substantially straight portion of the cross arm 17 to remove the flash therefrom.

At the end of the flash removing operation, the milling cutter may be moved in a reverse direction along the same path of travel to its initial starting position. Preferably, on completion of the flash removing operation, the milling cutter is raised above the work before returning it to its starting position. However, since the mechanism for raising the milling cutter forms no part of the present invention, it has been omitted for sake of simplifying the application.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus of the type described, a work holder, means for supporting said work holder, a member mounted on said supporting means for movement thereon in a first direction, a tool holder mounted on said member for movement therewith in said first direction and for movement relative thereto toward and away from said work holder in a second direction transversely of said first direction, track means on said supporting means, a lever connected pivotally intermediate the ends thereof to said member, follower means on the ends of said lever engaging said track means, and means for moving said follower means along said track means, said track means in cooperation with said follower means serving to guide said tool holder for movement in said first and said second directions in response to movement of said follower means along said track means.

2. In an apparatus of the type described, a work holder, means for supporting said work holder, a member pivotally mounted on said supporting means for lateral movement about a pivot, a tool holder mounted on said member for lateral movement therewith and for longitudinal movement relative thereto toward and away from said work holder in a direction substantially radial to said pivot, a lever connected pivotally intermediate the ends thereof to said member, follower means on the ends of said lever, fixed track means on said supporting means cooperable with said follower means for guiding said tool holder for longitudinal and lateral movement in response to movement of said follower means along said track means, and means for moving said follower means along said track means.

3. Mechanism for moving an element along an irregular path comprising a support, a member mounted on said support for lateral movement about a pivot, a holder for said element mounted on said member for lateral movement therewith and for longitudinal movement relative thereto in a direction substantially radial to said pivot, a pair of cam tracks on said support, a lever pivotally connected intermediate its ends to said holder and having followers at opposite ends thereof engaging said cam tracks, and means for moving said lever, said cam tracks cooperating with said followers and said lever to impart longitudinal and lateral movement to said holder during the movement of said lever.

4. A mechanism for moving an element along an irregular path comprising a support, a member mounted on said support for movement thereon in a first direction, a holder for said element mounted on said member for movement therewith in said first direction and for movement relative thereto in a second direction transversely of said first direction, a pair of cam tracks on said support, a lever pivotally connected intermediate its ends to said holder and having followers at opposite ends thereof engaging said cam tracks, and means for moving said lever, said cam tracks cooperating with said followers and said lever to impart movement to said holder in said first and said second directions during the movement of said lever.

5. In an apparatus for milling an irregular contour of an article, a work holder for supporting the article, means for supporting the work holder, a holder for supporting a milling tool, a carrier for supporting said tool holder for longitudinal movement thereon toward and away from said work holder, means for mounting said carrier on said supporting means for lateral movement transversely of said longitudinal movement, a lever pivotally connected intermediate its ends to said tool holder, followers mounted on the ends of said lever, a first track for guiding one of said followers for limited rectilinear movement, a second track for guiding the other follower for movement through a predetermined irregular path to effect longitudinal and lateral movement of said tool holder and the milling tool along a predetermined path in response to movement of said other follower along said second track, and means for moving said lever to advance said other follower along said second cam track.

6. In an apparatus of the type described, a work holder, means for supporting the work holder, a carrier mounted on said supporting means for lateral rocking movement about a pivot, a tool holder mounted on said carrier for lateral pivotal movement therewith and for longitudinal movement relative thereto toward and away from said work holder in a direction substantially radial to said pivot, a lever pivotally connected intermediate its extremities to said tool holder, followers mounted on the extremities of said lever, a pair of cam tracks fixedly mounted on said supporting means engaging said followers, one of said cam tracks serving to guide one of said followers for limited movement, the other of said cam tracks serving to guide the other cam follower for movement through a predetermined irregular path to effect longitudinal and lateral movement of the tool holder through a predetermined path in response to movement of said other cam follower along said other cam track, and means for moving said lever to advance said other follower along said other cam track.

7. In an apparatus of the type described, a work holder, means for supporting said work holder, a member pivotally mounted on said supporting means for lateral movement about a pivot, a tool holder mounted on said member for lateral movement therewith and for longitudinal movement relative thereto toward and away from said work holder in a direction substantially radial to said pivot, a lever connected intermediate its ends to said tool holder, a first cam follower on one end of the lever, a second follower on the other end of said lever, a link pivotally connected at one end thereof to said other end of said lever, a third follower on the other end of said link, a first cam track fixedly mounted on said supporting means for guiding said first follower for limited movement, a second cam track for guiding said second and said third followers for movement along an irregular path to effect longitudinal and lateral movement of said tool holder, and means engageable with the other end of said link for moving said second and third followers along said second cam track.

8. In an apparatus of the type described, a work holder, means for supporting said work holder, a member mounted on said supporting means for movement thereon in a first direction, a tool holder mounted on said member for movement therewith in said first direction and for movement relative thereto toward and away from said work holder in a second direction transversely of said first direction, a lever, means on said tool holder pivotally connected to said lever intermediate the ends thereof for supporting said lever for movement with said tool holder, a first cam follower on one end of the lever, a second follower on the other end of said lever, a link pivotally connected at one end thereof to said other end of said lever, a third follower mounted on said other end of said link, a fixed first cam track for guiding said first follower for limited movement, a fixed second cam track for guiding said second and said third followers for movement along a predetermined path to effect the movement of said tool carrier in said first and said second directions, and means engageable with the other end of said link for moving said second and third followers along said second cam track.

9. In an apparatus of the type described, a work holder, means for supporting said work holder, a member mounted on said supporting means for movement thereon in a first direction, a tool holder mounted on said member for movement therewith in said first direction and for movement relative thereto toward and away from said work holder in a second direction transversely of said first direction, a lever, means for pivotally connecting said lever intermediate the ends thereof to said tool holder, a first follower on one end of the lever, a second follower on the other end of said lever, a link pivotally connected at one end thereof to said other end of said lever, a third follower mounted on the other end of said link, a fixed first cam track for guiding said first follower for limited movement, a fixed second cam track for guiding said second and said third followers for movement along a predetermined path to effect the movement of said tool carrier in said first and said second directions, said second track having a first portion thereof extending in the general direction of said second direction of movement of said tool holder and having a second portion extending transversely of said first portion, and a fluid-operated actuator mounted on said supporting means and having a piston operatively connected to said third follower for moving said second and said third followers along said second track from a normal retracted position at one end of said first portion of said second track to an operative position with said third follower disposed in said first portion of said second track adjacent to said second portion thereof and with said second follower in said second portion of said second track.

References Cited in the file of this patent
UNITED STATES PATENTS

| | | |
|---|---|---|
| 2,392,606 | Maddox | Jan. 8, 1946 |
| 2,808,765 | Gunderson | Oct. 8, 1957 |
| 3,024,684 | Stratman | Mar. 13, 1962 |